(12) United States Patent
Tanishiki et al.

(10) Patent No.: US 6,180,908 B1
(45) Date of Patent: Jan. 30, 2001

(54) ELECTRIC ARC DISCHARGE DEVICE AND METHOD

(75) Inventors: Hideki Tanishiki; Hajime Yoshida, both of Osaka (JP)

(73) Assignee: Exedy Corporation, Osaka (JP)

(*) Notice: Under 35 U.S.C. 154(b), the term of this patent shall be extended for 0 days.

(21) Appl. No.: 09/285,267

(22) Filed: Apr. 2, 1999

(30) Foreign Application Priority Data

Apr. 10, 1998 (JP) .................................................. 10-098742

(51) Int. Cl.$^7$ ............................... B23H 1/00; B23H 9/14
(52) U.S. Cl. ............................... 219/69.14; 219/69.15; 219/69.17
(58) Field of Search ............................ 219/69.14, 69.15, 219/69.17

(56) References Cited

U.S. PATENT DOCUMENTS

| | | | |
|---|---|---|---|
| 3,144,540 | * | 8/1964 | Haas ................................... 219/69.14 |
| 5,004,530 | * | 4/1991 | Tanaka ............................... 219/69.14 |
| 5,408,063 | * | 4/1995 | Onishi ................................ 219/69.14 |
| 5,539,172 | * | 7/1996 | Takase et al. ...................... 219/69.17 |
| 5,599,466 | * | 2/1997 | Maier et al. ....................... 219/69.14 |
| 5,739,497 | * | 4/1998 | Tanaka ............................... 219/69.14 |

* cited by examiner

Primary Examiner—Geoffrey S. Evans

(74) Attorney, Agent, or Firm—Shinjyu Global IP Counselors, LLP

(57) ABSTRACT

An electric discharge device 9 is provided for removing material from a workpiece 5 to form a through hole 5b therein. The electric discharge device 9 is designed to maintain the pressure of processing liquid after the hole 5b extends through the workpiece 5 to thereby stabilize the electric discharge during the hole forming process. Basically, the electric discharge device 9 includes a movable discharging electrode 10, an arc voltage discharging device 11, a processing liquid supply mechanism 13 and an indexing mechanism 15. The arc voltage charging device 11 supplies current at a predetermined voltage between the discharging electrode 10 and a workpiece 5. An electrode reciprocating mechanism 12 moves the discharging electrode 10 towards and away from the workpiece. The processing liquid supply mechanism 13 is fluidly coupled to an internal bore 10a of the discharging electrode 10 for supplying processing liquid inside the discharging electrode 10. The processing liquid flows out of an end of the discharging electrode 10 and engages the workpiece 5. The indexing mechanism 15 has a jig 14 with a plurality of concave portions or recesses 14a that are positioned to correspond to the discharging electrode 10. These concave portions or recesses 14a maintain the pressure of the processing liquid after a through hole 5b is formed on the workpiece 5. In the preferred embodiment, the workpiece 5 is a gear with a plurality of holes being formed between adjacent teeth portions. The gear has an annular space 6 that receives the jig 14.

13 Claims, 5 Drawing Sheets

ELECTRIC ARC DISCHARGE DEVICE AND METHOD

BACKGROUND OF THE INVENTION

1. Field of the Invention

This invention generally relates to an electric discharge device and a method of using the electric discharge device. More specifically, the present invention relates to an apparatus and method of performing a hole forming process on a workpiece by utilizing an electric discharge device.

2. Background Information

An electric arc discharge process is often used to cut or form holes in a metal workpiece. Specifically, an arc voltage charging device is connected between an electrode and a workpiece. Current flows from the arc voltage charging device to the electrode. When the electrode is located adjacent the workpiece, an arc is formed between the electrode and the workpiece such that current passes from the electrode through the workpiece and back to the arc voltage charging device. The arc from the electrode then causes material of the workpiece to be eroded away. The workpiece is often processed under an insulating liquid, with intermittent electric arcs occurring between the electrode and the workpiece under the insulating liquid. The conventional electric discharge methods used to form a hole in a workpiece have many advantages over conventional mechanical methods of forming a hole. For example, prior art electric discharge processes typically do not create burrs during the formation of holes. Moreover, these prior art electric discharge processes can typically form diagonal holes without any difficulty. These prior art electric discharge processes can also be used to process workpieces made of very hard rigid material.

An example of a conventional electric arc discharge process is diagrammatically illustrated in FIGS. 1 and 2. As seen in FIG. 2, a hole is formed in a workpiece 1 using a long cylindrical discharging electrode 2. The diameter of the electrode 2 is sized to correspond to the diameter of the hole to be formed. This discharging electrode 2 is cylindrical and has an internal pathway 2a through which processing liquid flows. The hole is formed in the workpiece as the discharging electrode 2 is moved downwardly towards the workpiece with the processing liquid being supplied through the pathway 2a.

When a hole forming process is performed with a processing liquid being supplied to the above-described discharging electrode 2, a sludge or process powder is formed. The sludge or process powder from the workpiece is disposed of by the processing liquid, which flows upwardly around the discharging electrode 2. This disposal of the sludge or process powder occurs until the hole formed in the workpiece 1 by the discharging electrode 2 passes through the workpiece 1.

However, as shown in FIG. 2, when the discharging electrode 2 passes through the workpiece 1, the processing liquid starts to flow out of the hole, which decreases the pressure of the processing liquid. Also, the sludge or process powder builds up around the electrode since it is no longer being properly disposed of by the processing liquid. Furthermore, the electric discharge between the electrode 2 and the workpiece 1 becomes unstable because the arc or electric discharge is occurring in the air instead of under the processing liquid. The discharging electrode 2 is moved downward by a servo-actuated control. When electric discharge or arcs becomes unstable, the discharging electrode 2 goes down less smoothly. As a result, just prior to completion of the hole forming process, the discharging electrode 2 keeps moving up and down, which lengthens the time to complete the hole forming process.

To solve such problems, prior art electric arc discharging devices blow compressed air from beneath the processing hole to keep the processing liquid from escaping out of the bottom of the processing hole. Although this method prevents arcs or electric discharges from occurring in the absence of the processing liquid, it still does not stabilize the pressure of the processing liquid. Therefore it is difficult for electric discharges or arcs to take place under the most desirable conditions.

In view of the above, there exists a need for electric discharge device which overcomes the above mentioned problems in the prior art. This invention addresses this need in the prior art as well as other needs, which will become apparent to those skilled in the art from this disclosure.

SUMMARY OF THE INVENTION

One purpose of the present invention is to provide a method of forming a hole with an electrode submersed in a processing liquid such that the pressure of the processing liquid is maintained after the hole passes through the workpiece to stabilize the electric discharge.

An electric discharge device performs a hole forming process on a workpiece, using electric discharge in accordance with the present invention. The electric discharge device basically comprises a discharge electrode, an arc voltage charging device, a control mechanism, a supply of processing liquid and means for maintaining the pressure of the processing liquid when the through hole is formed in the workpiece. The discharging electrode has a free end that is positioned adjacent the workpiece. The arc voltage charging device is operatively coupled to the discharging electrode to supply a discharged voltage for applying discharged voltage between the discharging electrode and the workpiece. The control mechanism is coupled to the discharging electrode to move the discharging electrode towards and away from the workpiece. The supply of processing liquid is arranged to supply a processing liquid under pressure to the free end of the discharging electrode.

This electric discharge device forms a hole on a workpiece by moving the discharging electrode while letting electric discharge take place between the workpiece and the discharging electrode. Simultaneously, processing liquid is disposed of together with sludge to outside the hole on the workpiece through a space between the discharging electrode and the workpiece. In this way, the electric discharge process is kept stable until the hole passes through the workpiece.

Furthermore, when the process reaches the point where the hole passes through the workpiece, the pressure of the processing liquid is maintained by a pressure maintenance means. In this way, the electric discharge is kept under the liquid, and the electric discharge process remains stable. Also, the pressure of the processing liquid is maintained even after the workpiece hole extends all the way through the workpiece. Therefore, the processing speed can be kept stable all the way through the end of the process.

The means of maintaining the pressure of processing liquid is a jig that has concave portions or recesses corresponding to the discharging electrode. The jig is coupled to the workpiece. In this device, the jig is coupled in a space on a rear surface side of the workpiece. The concave portions or recesses are formed on portions of the jig corresponding to the discharging electrode. When the hole goes through the workpiece, the processing liquid flowing out of the hole collides against the concave portion and is directed upwardly between the workpiece and the electrode. The sludge is also carried by the processing liquid through a space between the hole of the workpiece and the discharging electrode.

In this case, since the concave portions or recesses are formed on the jig with sufficient depths, the jig will not be processed, even after the discharging electrode passes through the workpiece. Therefore, a plurality of workpieces can be processed with one jig, which is very important in mass production.

In a preferred embodiment, the workpiece is a gear member that has teeth portions on the outer peripheral portion, and a space on an inner peripheral side of the teeth portions. Holes are formed on the bottom of the teeth portions by the electric discharge device. The jig is inserted into the space of the gear member to be coupled therewith.

Processing liquid can be supplied to a workpiece through an internal passageway of the cylindrical discharging electrode. In a preferred method of the present invention, the workpiece is secured on the jig, which has concave portions or recesses on positions corresponding to the positions of the workpiece, at which the holes are to be formed. Processing liquid is supplied from inside the discharging electrode, while discharged voltage is applied between the discharging electrode and the workpiece. Discharged current flows intermittently between the electrode and the workpiece to form the holes.

In accordance with another aspect of the present invention, an electric discharge method for forming a hole, comprising the steps of coupling a workpiece to a jig with at least one recess located on an opposite side of the workpiece from a free end of a discharging electrode; supplying processing liquid under pressure to the free end of the discharging electrode that is positioned adjacent the workpiece; applying voltage between the discharging electrode and the workpiece to cause an arc to be formed between the free end of the discharging electrode and the workpiece; progressively moving the discharging electrode toward the workpiece as the hole being formed becomes deeper; and maintaining the pressure of the processing liquid when the hole extends through the workpiece by positioning the at least one recess of the jig beneath the hole being formed.

In the method described above, the pressure of the processing liquid is maintained until the end of the electric discharge process, which stabilizes the condition of electric discharge. This way, the process takes place smoothly and the time to complete the process can be shortened.

These and other objects, features, aspects and advantages of the present invention will become readily apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
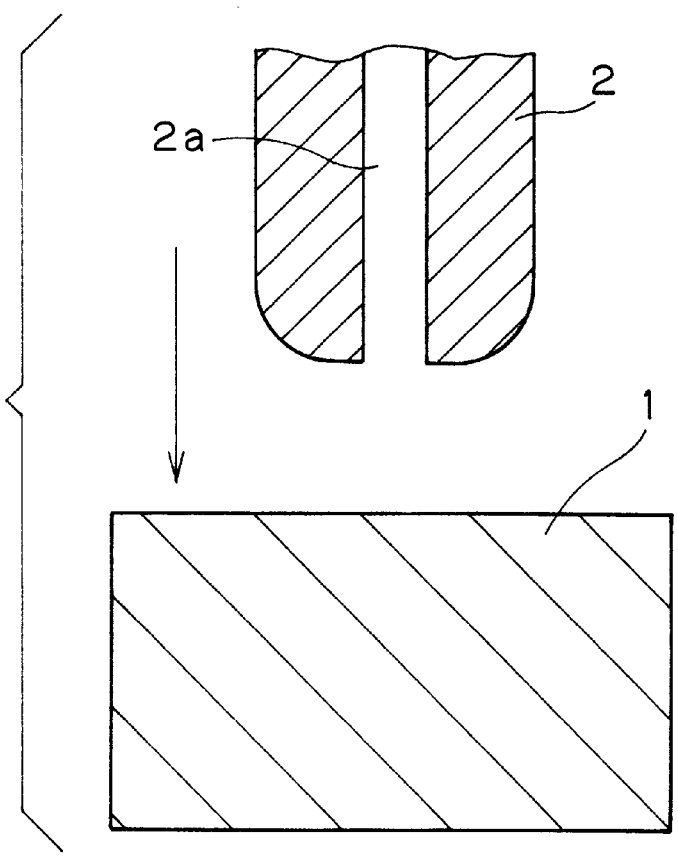
FIG. 1 is a diagrammatic cross-sectional view of a prior art electric discharge device shown prior to penetration of the workpiece.
Figure 2:
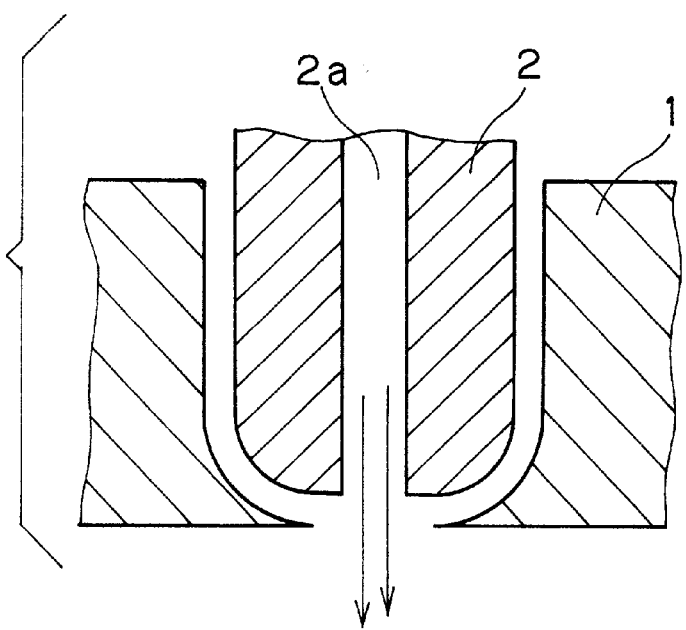
FIG. 2 is a diagrammatic cross-sectional view of the prior art electric discharge device illustrated in FIG. 1, after a predetermined amount of material of the workpiece has been removed by electric discharge processing.
Figure 3:
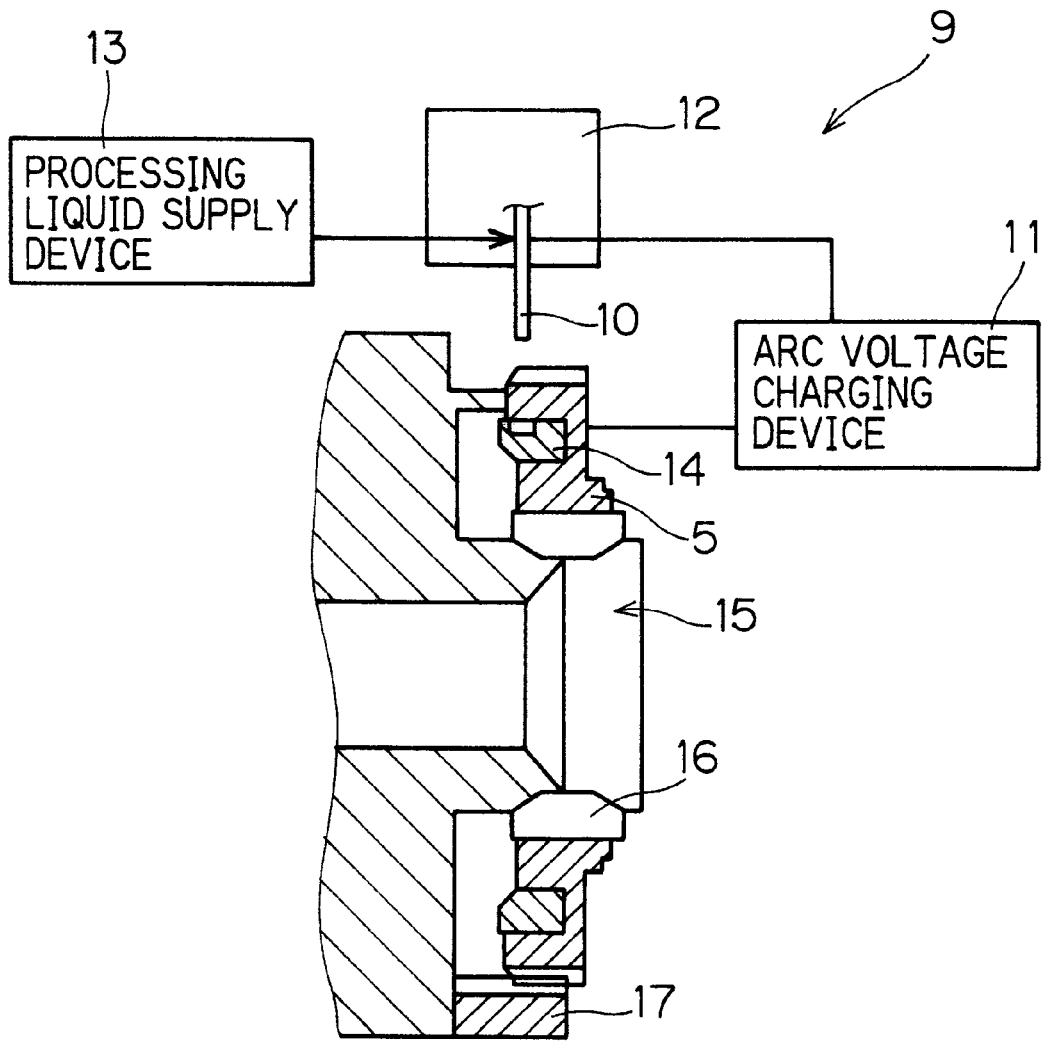
FIG. 3 is a schematic view of an electric discharge device in accordance with the present invention being applied to a workpiece.
Figure 4:
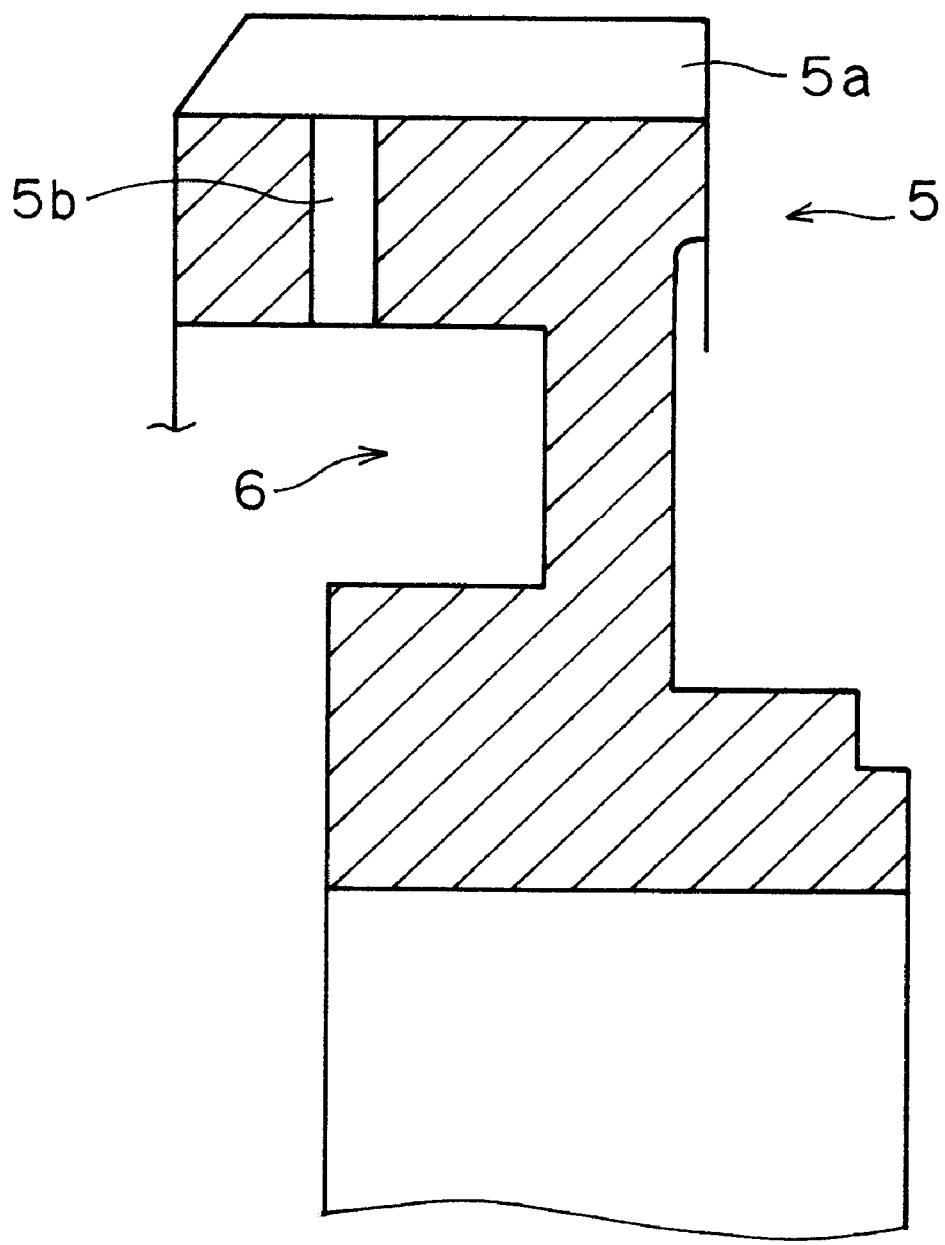
FIG. 4 is an enlarged cross-sectional view of the workpiece illustrated in FIG. 3.

Referring initially to FIGS. 3 and 4, a schematic diagram of an electric discharge device 9 is illustrated in accordance with one embodiment of the present invention. In the illustrated embodiment, a plurality of radial holes 5b is formed in the outer peripheral surface of a workpiece 5. The workpiece 5 in this illustrated embodiment is a gear member. The gear member or workpiece 5 has a plurality of teeth portions 5a on an outer peripheral portion, and an annular space 6 on an inner peripheral side of the toothed portions 5a as shown in FIG. 4.

The electric discharge processing device 9, as shown in FIG. 3, basically includes a long cylindrical discharging electrode 10, an arc voltage charging device 11 for applying discharged voltage between the discharging electrode 10 and the workpiece 5 to let electric current flow intermittently therebetween. The device 9 also has a reciprocating mechanism 12 for moving the discharging electrode 10 up and down, a processing liquid supply mechanism 13 for supplying processing liquid, and a jig 14. The jig 14 is coupled in the space 6 of the workpiece 5. The discharging electrode 10 is moved downward by servo-actuated control of reciprocating mechanism 12.

When a hole forming process is performed on workpiece 5, a processing liquid is supplied to the discharging electrode 10 from the processing liquid supply member 13. The processing liquid is supplied under pressure such that sludge (process powder) produced during the forming of hole 5b is disposed of together with the processing liquid by flowing upwardly around the discharging electrode 10. This occurs until the hole 5b formed in the workpiece 5 by the discharging electrode 10 passes through the workpiece 5.

Once hole 5b passes through the workpiece 5, the processing liquid starts flowing out of the hole 5b. However, the jig 14 maintains the pressure of the processing liquid so that the processing liquid and sludge continue to be disposed of by flowing upwardly around the discharging electrode 10. But for the use of the jig 14, the pressure of the processing liquid would decrease. Also, sludge around the electrode 10 would not be properly disposed of, if the jig 14 were not used. Furthermore, the electric discharge between the electrode 10 and the workpiece 5 becomes unstable because aerial electric discharge takes place, instead of liquid electric discharge, if the jig 14 were not used.

The electric discharge device 9 of the present invention performs an electric discharge process with the jig 14 which has concave portions or recesses 14a at positions corresponding to discharging electrode 10. The jig 14 is coupled within space 6 of workpiece 5. In this way, the pressure of processing liquid can be maintained even after a through hole 5b is formed in the workpiece 5. As a result, the electric discharge process remains stable and the processing time just before the process is completed can be shortened.

The workpiece 5 is adapted to be fixedly coupled to an indexing device 15. The indexing device 15 is capable of measuring the angle at which the workpiece 5 is attached thereto. More specifically, the indexing device 15 rotates the workpiece 5 and the jig 14 to a plurality of set positions so that a plurality of holes 5b can be formed at predetermined locations. The indexing device 15 includes a collet 16, which fixes an inner peripheral portion of the workpiece 5 thereto. The indexing device 15 also has outer positioning blocks 17 on an outer peripheral side for engaging with the toothed portions 5a of the workpiece 5 to fix the position of the workpiece 5 relative to the indexing device 15. The indexing device 15 further includes a mechanism (not shown) for rotating the workpiece 5 while keeping all the portions that fix the workpiece 5 at predetermined angular positions.

Figure 5:
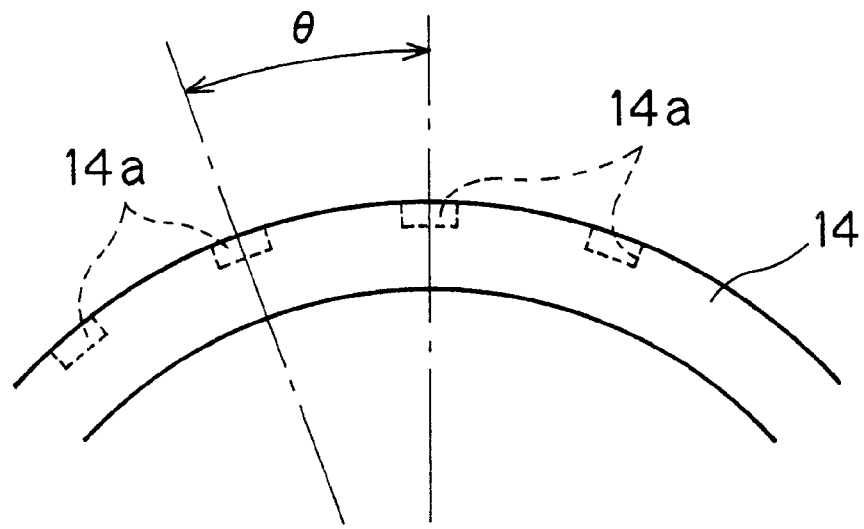
FIG. 5 is an enlarged partial front elevational view of the jig illustrated in FIG. 3.
Figure 6:
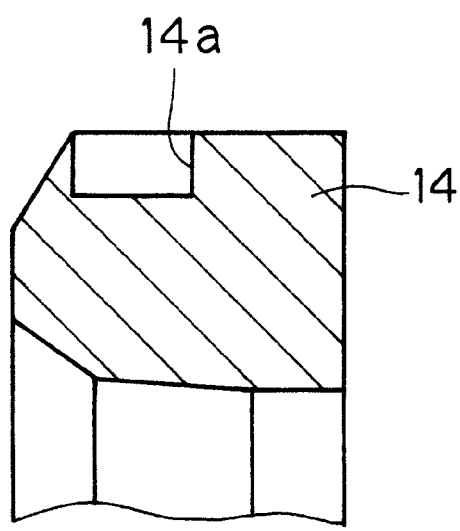
FIG. 6 is an enlarged partial cross-sectional view of the jig illustrated in FIGS. 3 and 5.
Figure 7:
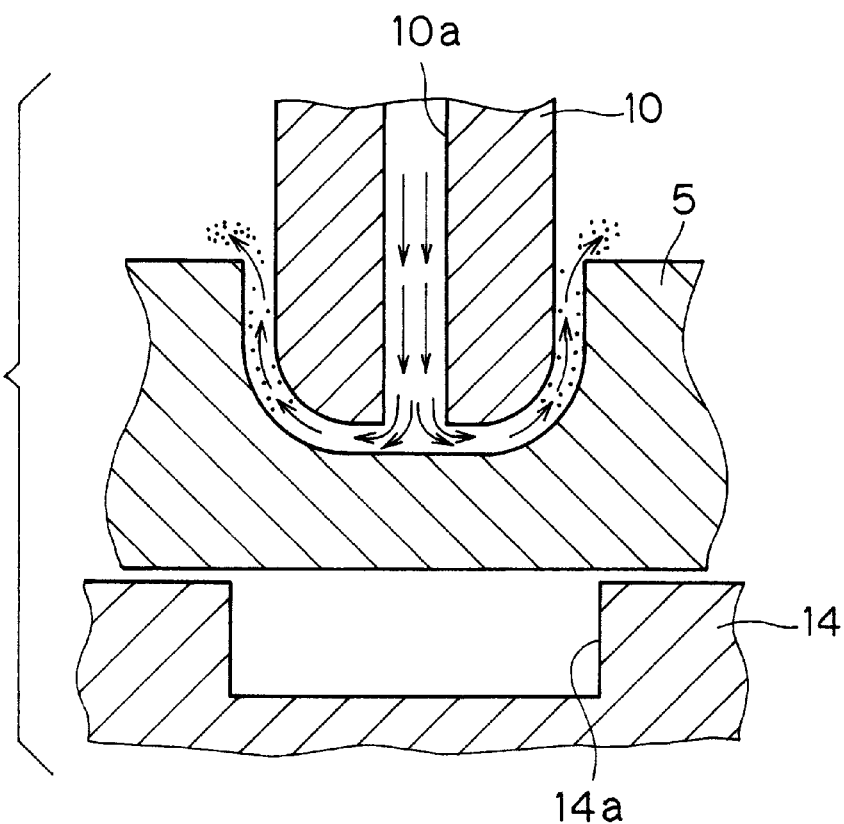
FIG. 7 is an enlarged cross-sectional view of the electric discharge processing device in accordance with the present invention illustrating partial penetration of the workpiece.
Figure 8:
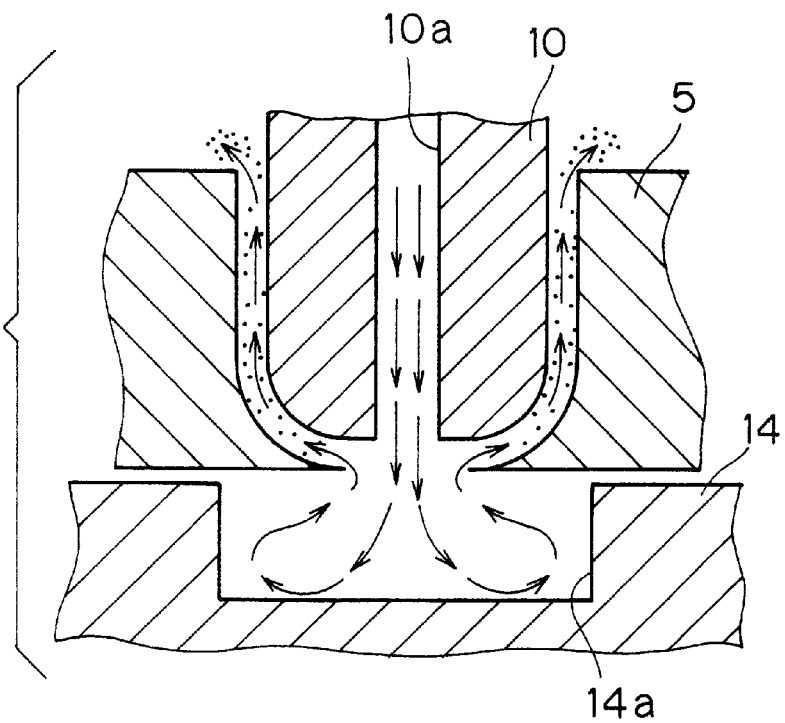
FIG. 8 is a cross-sectional view of the electric discharge processing device of the present invention illustrating full penetration of the workpiece.

As shown in an enlarged manner in FIGS. 7 and 8, the discharging electrode 10 has a substantially cylindrical or tubular shape. In particular, the discharging electrode 10 has a central pathway 10a through which the processing liquid flows. Preferably, as shown in FIGS. 5 and 6, the jig 14 is formed as an annular ring shaped member with a plurality of concave portions or recesses 14a that are located on its outer periphery. Preferably, concave portions or recesses 14a of the jig 14 are equally spaced apart around its outer periphery. The positions of concave portions 14a correspond to the location of the discharging electrode 10. The concave portions 14a are slightly larger in diameter than the diameter of the discharging electrode 10. The concave portions 14a are formed with a constant angular gap θ between adjacent concave portions 14a. The concave portions or recesses 14a do not extend through the jig 14. The depth of concave portions 14a should be such that the arcs from the discharging electrode 10 do not significantly damage the jig 14.

When the hole 5b is formed on the bottom of the gear between the teeth portion 5a using such an electric discharging device 9 as described above, the jig 14 is coupled into the space 6 of the workpiece 5. The jig 14 and the workpiece 5 are fixedly coupled together such that they do not rotate relative to each other. The workpiece 5 and the jig 14 are also then fixedly coupled to the index device 15 as a single unit.

Next, the discharging electrode 10 is progressively moved downward while electric current and the processing liquid are supplied thereto. The speed of discharging electrode 10 going downward is adjusted according to the amount of the electric current supplied to the electrode 10. The movement of the discharging electrode 10 is controlled by reciprocating mechanism 12 such that the delay time between the time when discharged voltage is applied and the time when the electric discharge actually takes place is measured and kept constant. In other words, the electrode 10 is moved downward, relative to the workpiece 5 such that the gap between the electrode 10 and the workpiece remains constant as material is removed from workpiece 5.

As shown in FIG. 7, while the processing hole 5b does not extend through the workpiece 5, the processing liquid flowing out of the pathway 10a of the discharging electrode 10 is disposed of together with sludge flowing along the periphery of the discharging electrode 10 toward an upper opening portion of hole 5b. For this reason, sludge is properly disposed of during the processing of hole 5b. Since the tip of the discharging electrode 10 is kept under the liquid, the electric discharge or arc remains stable. As a result, the discharging electrode 10 moves down more smoothly while performing the hole forming process.

When the electric discharge device 9 advances and the hole 5b passes through the workpiece 5 as shown in FIG. 8, the processing liquid supplied from the pathway 10a of the discharging electrode 10 is disposed of downward from the workpiece 5. Since the jig 14 is attached to the bottom of the workpiece 5 and the concave portion or recesses 14a is formed on the jig 14 such that the concave portion or recesses 14a corresponds to the discharging electrode 10, the processing liquid cannot escape from the bottom of hole 5b. In this way, the processing liquid is caused to flow upward along the periphery of the discharging electrode 10 together with the sludge and out of the workpiece 5. Since the processing liquid does not flow downward, the pressure of the processing liquid around the discharging electrode 10 does not decrease, so that electric discharge can be kept stable, and aerial discharge is reduced or eliminated.

Since the pressure of the processing liquid flowing out of the discharging electrode 10 is maintained even after the hole 5b passes through the workpiece 5, the speed of electric discharge process does not decrease. This enables the process to advance more smoothly.

Also, since the concave portions or recesses 14a are formed on the outer surface of the jig 14 and the jig 14 is coupled with the workpiece 5 such that the concave portions or recesses 14a are located opposite the discharging electrode 10, the jig 14 can avoid being processed with the discharging electrode 10. This makes it possible to process a plurality of workpieces 5 with a single jig 14.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An electric discharge device for forming a through hole in a workpiece, comprising:
    a discharging electrode having a free end;
    a discharge voltage charging device operatively coupled to said discharging electrode to supply a discharged voltage for applying discharged voltage between said discharging electrode and the workpiece;
    a control mechanism coupled to said discharging electrode to move said discharging electrode towards and away from the workpiece;
    a supply of processing liquid arranged to supply a processing liquid under pressure to said free end of said discharging electrode; and
    means for maintaining the pressure of said processing liquid when the through hole is formed in the workpiece by providing a surface located at a spaced distance beneath an area of the workpiece where the through hole is being formed to maintain the pressure of said processing liquid.

2. An electric discharge device as set forth in claim 1, wherein said means for maintaining pressure of processing liquid includes a jig having at least one recess located in a position that corresponds to said discharging electrode.

3. An electric discharge device for forming a through hole in a workpiece, comprising:
- a discharging electrode having a free end;
- a discharge voltage charging device operatively coupled to said discharging electrode to supply a discharged voltage for applying discharged voltage between said discharging electrode and the workpiece;
- a control mechanism coupled to said discharging electrode to move said discharging electrode towards and away from the workpiece;
- a supply of processing liquid arranged to supply a processing liquid under pressure to said free end of said discharging electrode; and
- means for maintaining the pressure of said processing liquid when the through hole is formed in the workpiece, said means for maintaining pressure of processing liquid including a jig having at least one recess located in a position that corresponds to said discharging electrode, said means for maintaining pressure of processing liquid further including an indexing device that rotatably mounts said jig and the workpiece about a longitudinal axis.

4. An electric discharge device as set forth in claim 3, wherein said jig includes a plurality of said recesses located in positions that correspond to said discharging electrode.

5. An electric discharge device as set forth in claim 4, wherein said jig is an annular ring shaped member.

6. An electric discharge device as set forth in claim 3, wherein said indexing device includes a collet to couple the workpiece to said indexing device.

7. An electric discharge device for forming a through hole in a workpiece, comprising:
- a discharging electrode having a free end;
- a discharge voltage charging device operatively coupled to said discharging electrode to supply a discharged voltage for applying discharged voltage between said discharging electrode and the workpiece;
- a control mechanism coupled to said discharging electrode to move said discharging electrode towards and away from the workpiece;
- a supply of processing liquid arranged to supply a processing liquid under pressure to said free end of said discharging electrode; and
- means for maintaining the pressure of said processing liquid when the through hole is formed in the workpiece, said means for maintaining pressure of processing liquid includes a jig having a plurality of recesses located in positions that correspond to said discharging electrode.

8. An electric discharge method for forming a hole, comprising the steps of:
- coupling a workpiece to a jig with at least one recess with an opposed surface located at a spaced distance beneath an area of the workpiece where the hole is being formed, on an opposite side of said workpiece from a free end of a discharging electrode;
- supplying processing liquid under pressure to said free end of said discharging electrode that is positioned adjacent said workpiece;
- applying voltage between said discharging electrode and said workpiece to cause an arc to be formed between said free end of said discharging electrode and said workpiece;
- progressively moving said discharging electrode toward said workpiece as the hole being formed becomes deeper; and
- maintaining the pressure of said processing liquid when the hole extends through said workpiece by positioning said opposed surface of said at least one recess of said jig beneath the hole being formed.

9. An electric discharge method for forming a hole, comprising the steps of:
- coupling a workpiece to a jig with at least one recess located on an opposite side of said workpiece from a free end of a discharging electrode;
- supplying processing liquid under pressure to said free end of said discharging electrode that is positioned adjacent said workpiece;
- applying voltage between said discharging electrode and said workpiece to cause an arc to be formed between said free end of said discharging electrode and said workpiece;
- progressively moving said discharging electrode toward said workpiece as the hole being formed becomes deeper; and
- maintaining the pressure of said processing liquid when the hole extends through said workpiece by positioning said at least one recess of said jig beneath the hole being formed,
- said workpiece being a gear member having a plurality of teeth portions on an outer peripheral portion, and a space on an inner peripheral portion for positioning said jig therein.

10. An electric discharge method as set forth in claim 9, wherein the hole being formed is located at between adjacent said teeth portions.

11. An electric discharge method for forming holes, comprising the steps of:
- coupling a workpiece to a jig with a plurality of recesses located on an opposite side of said workpiece from a free end of a discharging electrode;
- supplying processing liquid under pressure to said free end of said discharging electrode that is positioned adjacent said workpiece;
- applying voltage between said discharging electrode and said workpiece to cause an arc to be formed between said free end of said discharging electrode and said workpiece;
- progressively moving said discharging electrode toward said workpiece as the holes being formed becomes deeper;
- maintaining the pressure of said processing liquid when the holes extend through said workpiece by positioning said plurality of recesses of said jig beneath the holes being formed; and
- rotating said jig and said workpiece relative to said discharging electrode to form a plurality of the holes.

12. An electric discharge method as set forth in claim 11, wherein said workpiece is a gear member having a plurality of teeth portions on an outer peripheral portion, and a space on an inner peripheral portion for positioning said jig therein.

13. An electric discharge device as set forth in claim 12, wherein the hole being formed is located at between adjacent said teeth portions.

* * * * *